Patented Nov. 11, 1952

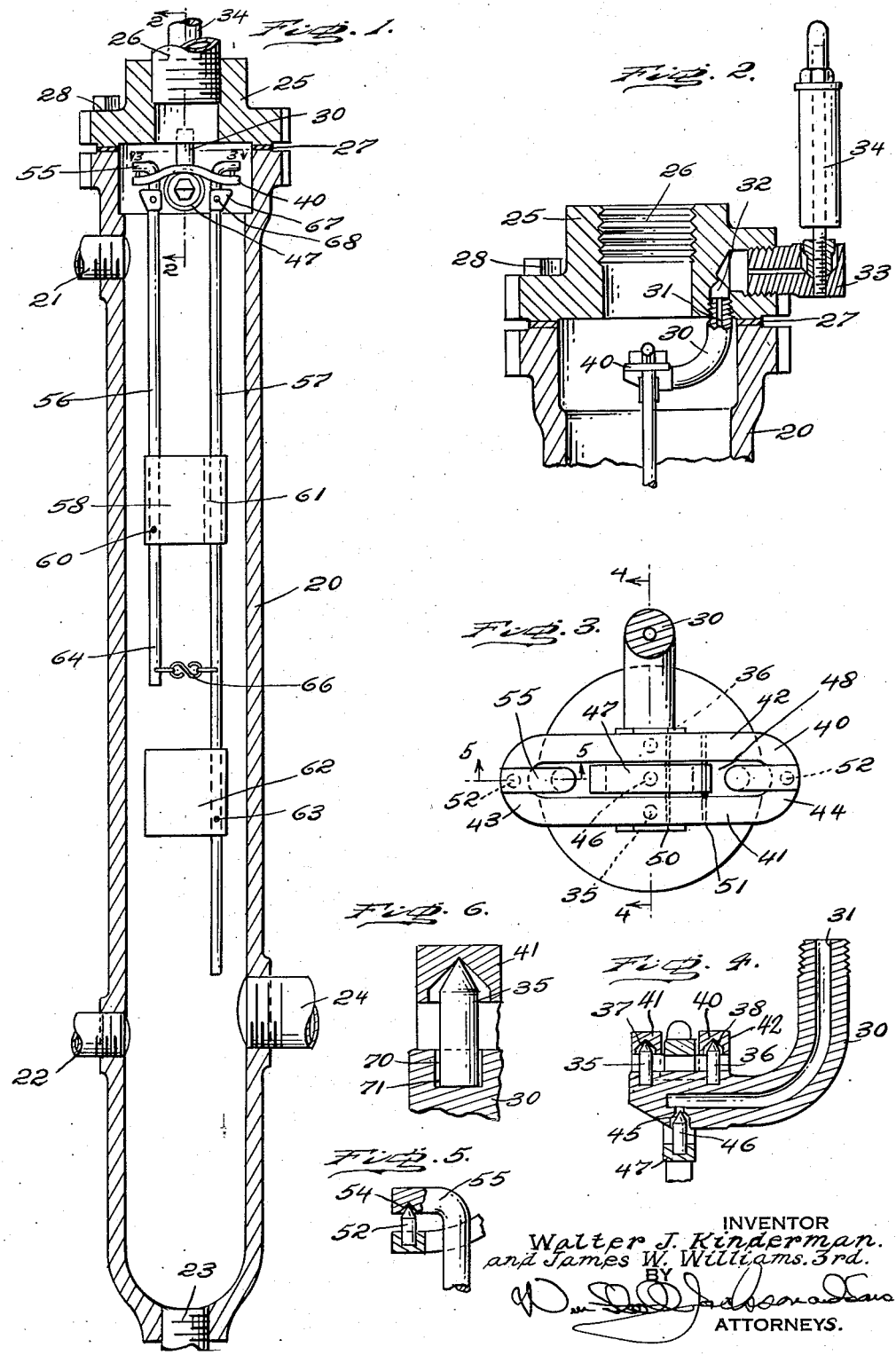

2,617,441

UNITED STATES PATENT OFFICE 2,617,441

LIQUID LEVEL ALARM

Walter J. Kinderman, Philadelphia, and James W. Williams, 3rd, Ambler, Pa., assignors to Yarnall-Waring Company, Philadelphia, Pa., a corporation of Pennsylvania Application March 25, 1950, Serial No. 151,938

10 Claims. (Cl. 137—214)

The present invention relates to liquid level alarms of the character commonly used in boilers and other similar pressure vessels to indicate abnormally high or abnormally low liquid levels.

A purpose of the invention is to simplify and reduce the cost of the construction of liquid level alarms particularly for low pressure applications, but also for high pressure work.

A further purpose is to pivot the balance lever and desirably also the balance rods on pivot pin points avoiding the difficulties previously encountered with knife edges, such as interference by dirt or scale, expensive machining operations to insure accuracy along the line of contact and reducing the over-all average pivot friction over preceding designs.

A further purpose is to mount the steam valve on the pivot support and to carry the steam passage through the pivot support.

A further purpose is to operate the steam valve by a valve ring which surrounds the pivot support and is connected to the balance lever by a pivot pin adjacent to but at one side of the center, the pivot pin desirably extending through opposite yoke sides of the balance lever.

A further purpose is to limit the motion of the balance lever by a stop pin extending across the yoke and contacting the valve ring.

A further purpose is to extend upper hook ends of float rods through the yoke of the balance lever into contact with the pivot pins at the outer ends of the balance lever.

A further purpose is to provide retaining clips on the float rods below the balance lever.

A further purpose is to extend the upper float rod below the upper float and to cross connect it to the lower float rod by tie links.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a fragmentary vertical axial section of the liquid level alarm of the invention.

Figure 2 is an enlarged fragmentary vertical axial section of Figure 1 on the line 2—2.

Figure 3 is an enlarged transverse section of Figure 1 on the line 3—3.

Figure 4 is a vertical axial section of Figure 3 on the line 4—4.

Figure 5 is a fragmentary section of Figure 3 on the line 5—5.

Figure 6 is an enlarged fragment of Figure 4, showing a modification.

Describing in illustration but not in limitation and referring to the drawings:

It is common to provide boilers and similar liquid-containing pressure vessels with liquid level alarms which operate a whistle or other alarm device when the liquid level becomes abnormally low or abnormally high. Many of these prior art devices have employed knife edge pivot suspensions which have been rather complex, and correspondingly costly, involving numerous toleranced parts which are expensive to machine. Difficulty has also been encountered in many of these prior art devices due to accumulation of dirt in the knife edge grooves or other delicate parts of the suspension, and the problem of maintenance has in some cases been a substantial factor.

In accordance with the present invention, the construction of a liquid level alarm is greatly simplified by eliminating knife edge bearings and substituting pin point supports which engage inverted conical sockets. The downwardly directed conical sockets suspended on the upwardly directed pins are self-centered in all lateral directions as compared to knife edge suspensions which, in the absence of special provisions, are only centered in a direction normal to the extent of the knife edge. The pin suspension construction also tends to shed any dirt or scale particles which might otherwise interfere with or increase the friction of the bearings.

The interconnection of the valve controlling steam flow to the whistle or other alarm with the balance lever has been greatly simplified in the device of the present invention, employing a valve ring which surrounds the pivot support and desirably acts as a limiter on the balance lever in one direction, the valve ring suitably being pivotally interconnected with the balance lever by a pin. Limiting of the balance lever in the other direction is desirably provided by a stop pin engaging the valve ring.

The balance support in the construction of the invention desirably combines the functions also of a valve seat support and steam connection to the whistle or other alarm, thus eliminating separate components.

In the structure of the invention, the balance lever is preferably of yoke formation and the upper ends of the float rods are constructed like hooks, passing up through the yoke and carrying downwardly directed pin suspension sockets which engage the pin point suspensions on the ends of the balance lever. The float rods are limited against displacement by retaining clips beneath the balance lever which are adapted to contact the yoke of the balance lever. This construction is superior to a more conventional knife edge suspension by reason of the interlocked engagement of the pin and the socket and the self-centering feature under shock conditions which might be caused by water hammer which could disengage or misalign a knife edge suspension.

The upper float rod is carried below the upper float in the construction of the invention to permit the tie link-connection with the lower float rod, restraining the float rods against lateral displacement, while permitting relative up and down motion.

When reference is made herein to "floats" the language of the art is used, the floats being in fact solid metallic displacement members which exert a relative buoying action on the rods.

Considering the construction of the invention, the alarm is contained within a tubular body 20 suitably of cast iron on low pressure work and steel on high pressure work, having upper and lower gage connections 21 and 22, a bottom drain connection 23 and a lower boiler connection 24. The body is closed at the top by a cap 25 having a top steam connection 26 to the boiler and sealed to the upper portion of the body by a gasket 27. The cap is held in place by any suitable cap bolts 28.

The cap carries depending therefrom a balance pivot support 30 suitably of goose neck shape having an interior bore 31 and making threaded connection into a passage 32 on the cap. The passage 32 receives a base fitting 33 of a whistle 34 of any suitable well known construction.

At the lower end of the pivot support 30, desirably placed in the plane of the L of the goose neck, are two spaced upwardly directed pivot suspension pins 35 and 36 desirably having conical upwardly directed pointed ends as best seen in Figure 4. Each of the pin point pivots 35 and 36 engages in a pivot socket 37 or 38 at the center of a balance lever 40 pivotally supported on the pin point pivots. The balance lever is desirably of slotted or yoke formation as best seen in Figure 3, having opposite side bars 41 and 42 joined by U bends at the end. The balance lever 40 is also desirably of inverted U side elevation as best seen in Figure 1, both ends 43 and 44 being lower in balance position than the middle.

At the bottom of the pivot support 30 and desirably equidistant between the pins 35 and 36 as shown in Figure 4 is a downwardly directed valve seat 45 communicating with the interior passage 31. Cooperating with the valve seat 45 is a suitably upwardly directed cone valve 46 which in closed position seals against the valve seat and in open position remains below the valve seat. The valve 46 is mounted and supported in a valve ring 47 which surrounds the pivot support 30 at a position between the pins 35 and 36 and extends into the slot 48 between the side bars 41 and 42 of the balance lever.

A pivot pin 50 seen in Figure 3 extends between the side bars 41 and 42 of the balance lever and through the valve ring, with enough freedom as it passes through the valve ring to permit pivoting of the valve ring as it is urged upwardly or downwardly by the balance lever.

It will be observed from Figure 3 that whereas the valve 46 is in line with the pivot pins 35 and 36 in top plan view, the pivot pin 50 is slightly removed to one side of but relatively close to the balance axis so that the valve is opened and closed under considerable mechanical advantage by the balance lever.

A stop pin 51 extends through the side bars 41 and 42 of the balance lever at a position farther removed from the axis than the pivot pin 50 as seen in Figure 3, the stop pin passing above the valve ring and engaging the valve ring to stop the motion of the balance lever in the clockwise direction in Figure 1.

At the outer ends 43 and 44 of the balance lever and at equal distances from the pivot pins 35 and 36 are placed pin point suspension pivots 52 best seen in Figure 5 which are desirably identical in construction with the pins 35 and 36 and engage downwardly directed pin point pivot sockets 54 on hook ends 55 respectively of an upper float rod 56 and a lower float rod 57. The float rods extend through the slot 43 between the sides of the yoke of the balance lever.

Upper float rod 56 supports a suitably solid steel float or displacement member 58 adjustably supported on the float rod as by a pin 60. Lower float rod 57 passes through a slot 61 in upper float 58 and at its lower end supports lower float 62 suitably of solid steel, adjustably positioned as by pin 63.

Upper float rod 56 has an extension 64 below the upper float and near the lower end of the extension is cross connected to lower float rod 57 by tie links 66 which are provided with sufficient freedom to permit the float rods to move up and down through their requisite distance, but restrain the float rods against lateral gyration which might cause them to contact the walls of the housing.

Retaining clips 67 are mounted on the float rods immediately below the balance lever by pins 68, and tend to prevent detachment of the float rods from their suspensions.

It will be noted that the upwardly directed pin point suspensions for the balance lever from the pivot support and for the float rods at the ends of the balance lever provide very low friction, in many cases lower than that obtained from the usual knife edge suspensions. Furthermore since the pin point suspensions are directed upwardly and are covered by downwardly directed sockets, the sockets tend to protect against intrusion of dirt to the bearing points and thus eliminate difficulty through contamination of the suspensions. The character of the conical point on the pin point suspensions is well suited to manufacture by production methods from stainless steel or other corrosion protecting materials, and inspection by quality control. The economy in the use of high grade alloys is much greater than that of the previous knife edge construction.

The valve ring which supports the valve and connects it with the balance lever permits a more favorable balance of forces acting on the balance lever, and aids in shortening the balance lever without complicating the construction. A downwardly directed valve seat cooperating with an upwardly directed valve are permitted, which reduces the danger of contamination of the valve by dirt. The centering of the valve in the valve seat is automatic due to the curvature of the valve ring. The valve ring also cooperates with the stop pin on the balance lever to stop the motion of the balance lever in one direction. A more sensitive response is obtained by this device than with previous constructions.

The combination of the pivot support, valve seat and steam connection into a single element reduces the cost of construction, permits off-center steam connection with the whistle without interfering with center steam connection to the column through the cap and simplifies the assembly.

The mounting of the bearing socket in the upper hook ends of the float rods avoids the necessity of providing special machined parts to interconnect with the float rods. The tie links between the rods contribute to locking the assembly together and reduce friction to a very small factor. The retaining clips on the float rods prevent disassembly of the parts under abnormal conditions such as water hammer.

The valve ring also serves to retain the balanced lever on the pin point suspension pivots 35 and 36 by restricting the upward movement of the lever, in case of water hammer, to a distance less than the depth of recessing of the bearing sockets.

In operation, the floats or displacement bodies 58 and 62 are located at high and low water level positions and are suspended on the float rods which are pivotally connected to the ends of the balance lever. When the water level is below both displacement bodies or above both displacement bodies, the unbalance of the two bodies acting on the balance lever causes the lower body to move downwardly tilting the balance lever clockwise in Figure 1. This causes the valve ring 47 to move downward under the leverage applied to pivot pin 50, and with it valve 46 moves downward away from the valve seat and opens the valve. Since pivot pin 50 is connected to the valve support ring 47 over a very short lever arm and float rods 56 and 57 are connected to the balance lever over a long lever arm, a comparatively slight unbalance of balancing lever 40 in the clockwise direction (Figure 1) causes a comparatively large force to be applied to open the valve. Steam then passes from the space in the upper part of the body 20 through the valve and through passage 31 and space 32 into fitting 33 and into the whistle, operating the whistle in any suitable manner. The tie links 66 keep the displacement bodies and rods in proper alignment during the motion described.

If the water level maintains a position between the two displacement bodies, as required under safe operating conditions, the lower displacement body 62 by displacing the volume of water loses its equivalent in buoyancy, and this counterbalances the initial urge for the lower displacement body to move downward and reverse the unbalance, causing the balance lever 40 to move counterclockwise in Figure 1, which in turn moves valve ring 47 upwardly through pivot pin 50 until further motion in this direction is arrested by valve 46 closing in valve seat 45. This cuts off the flow of steam from the upper part of body 20 to the whistle and stops the operation of the whistle until the water level again rises to a position of unbalance along the upper displacement body 58 or drops to a position of unbalance along the lower displacement body 62.

Lever movement in the direction of valve opening is limited when stop pin 51 contacts valve ring 47.

The displacement bodies are located along their supporting rods at the desired high and low water level positions, which can be varied to suit the requirements within the limiting lengths of the rods without disturbing the balance of the device. Retaining clips 67 on the rods assure that the rods will not become displaced on their pin point pivots at the ends of the balance lever in case of violent disturbance of the balance lever. The valve ring likewise prevents disengagement of the balance lever from its pivot pins 35 and 36.

To disassemble the parts, it is merely necessary to remove the cap 25, lifting out the balance mechanism, and then withdraw pivot pin 50 which connects the valve ring with the balance lever. This permits the balance lever to be lifted from its position on the pivot pins 35 and 36 and it can then be removed together with the rods and displacement bodies. The rods may be disengaged from the pins at the ends of the balance lever by tilting the lever with respect to the rods to an angle in excess of that permitted when the parts are inside the casing. The valve ring drops on the pivot support when pivot pin 50 is removed, thus permitting the valve to clear from the valve seat for free removal of the valve ring.

Exact alignment of the centers of the two pin point pivots 35 and 36 may be difficult in some cases, and we find that this can be accomplished very readily without excessively high precision in machining by permitting slight pin movement to take place in the opening in which the pin is seated, to take care of slight differences in socket center distances. It will be understood, of course, that the movement required will be very small, of the order of one-half of a thousandth of an inch or a thousandth of an inch. In Figure 6 we illustrate a pin 35 which has slight freedom at 70 in the opening 71 in which it rests on the support 30. It will be evident that the device of the invention greatly simplifies and lowers the cost of the construction of alarm mechanism.

It will be evident that the design permits progressive locking of the parts by assembly, the valve ring fulcrum pin serving as a final key to hold together the balance lever, valve support and valve ring.

It will further be evident that the pin point pivots are conical and the sockets are conical at a somewhat wider angle than the pivots, so that the sockets automatically realign and reengage the pivots whenever shock conditions, due to water hammer or the like, serve to cause separation of the parts. This automatic realignment is definitely advantageous.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a liquid level alarm, a hollow casing, a pivot support in the casing, a plurality of spaced upwardly directed pin point pivot pins on the top of the pivot support, a yoke-like balance lever extending over the pivot pins and having upwardly recessed pin point sockets which receive the respective pivot pins, one on one side of the yoke and one on the other side of the yoke, a steam valve having an operating member connected to the balance lever and closing against a seat communicating at the two sides of the seat with the inside and outside of the casing, pin point pivot pins upwardly directed at the opposite ends of the yoke, floats in the casing, and float rods connected to the respective floats and each extending up through the interior of the yoke and over the top of the yoke and having an upwardly recessed pin point socket which engages the pivot pins at the end of the yoke.

2. In a liquid level alarm, a hollow casing, a generally horizontal pivot support in the casing, pin point pivot pins upwardly directed on the pivot support, a balance lever extending over the pivot pins and having downwardly recessed pin point sockets at the center which receive the pivot pins, a downwardly directed valve seat on the support communicating with the outside of the casing, a valve in one position engaging the valve seat and upwardly directed toward the valve seat, a valve ring mounting the valve at its bottom, a pivot pin interconnecting the balance lever laterally with the valve ring at a distance from the center of the balance lever, floats in the casing, and valve rods connected pivotally from the floats to the respective ends of the balance lever.

3. In a liquid level alarm, a hollow casing, a pivot support in the casing having a horizontal portion and having a hollow interior communicating with the outside of the casing, upwardly directed pin point pivot pins on the pivot support, a balance lever extending across the pivot pins and having upwardly recessed pin point sockets which engage the pivot pins, a downwardly directed valve seat on the pivot support connected to the hollow interior, an upwardly directed valve cooperating with the valve seat, a valve ring extending around the pivot support and supporting the valve at the bottom of the valve ring, a pin pivotally connecting the balance lever with the valve ring at a point removed from the center of the balance lever, upwardly directed pin point pivot pins at the respective opposite ends of the balance lever, floats in the casing, and float rods connected to the floats and extending over the balance lever and having upwardly recessed pin point sockets which engage the pivot pins at the ends of the balance lever.

4. In a liquid level alarm, a hollow casing, a pivot support in the casing having a horizontal portion and having a hollow interior communicating with the outside of the casing, upwardly directed pin point pivot pins on the pivot support, a yoke shaped balance lever extending over the pivot pins and having on opposite sides of the yoke center upwardly recessed sockets which engage the pivot pins, a valve seat downwardly directed from the support at a position equally distant between the pivot pins and communicating with the hollow interior, an upwardly directed valve cooperating with the valve seat, a valve ring supporting the valve at the bottom of the ring and extending around the pivot support between the two sides of the yoke, a pivot pin extending across the yoke and through the valve ring at a position removed from the center of the balance lever, top and bottom floats in the casing and float rods pivotally interconnected between the respective floats and the respective ends of the balance lever.

5. In a liquid level alarm, a hollow casing, a pivot support in the casing having a horizontal portion and having a hollow interior communicating with the outside of the casing, upwardly directed pin point pivot pins on the pivot support, a yoke shaped balance lever extending over the pivot pins and having on opposite sides of the yoke center upwardly recessed sockets which engage the pivot pins, a valve seat downwardly directed from the support at a position equally distant between the pivot pins and communicating with the hollow interior, an upwardly directed valve cooperating with the valve seat, a valve ring supporting the valve at the bottom of the ring and extending around the pivot support between the two sides of the yoke, a pivot pin extending across the yoke and through the valve ring at a position removed from the center of the balance lever, top and bottom floats in the casing, upwardly directed pin point pivot pins at the opposite ends of the balance lever and float rods connected to the respective floats upwardly extending through the yoke and having upwardly recessed pin point sockets at the ends of the float rods which receive the pivot pins on the ends of the balance lever.

6. In a liquid level alarm, a hollow casing, a pivot support in the casing, upwardly directed pin point pivot pins on the support, a downwardly directed valve seat on the support communicating with the outside of the casing, a yoke-shaped balance lever extending over the pivot pins and having upwardly recessed sockets at the middle which receive the pivot pins, an upwardly directed valve cooperating with the valve seat, a valve ring surrounding the pivot support and supporting the valve at the bottom of the ring, the ring being located between the two sides of the yoke of the pivot support, a pivot pin extending through the balance lever at a position removed from the center and through the valve ring, upwardly directed pin point pivot pins at the outer ends of the balance lever, upper and lower floats in the casing, float rods connected to the respective floats, upwardly extending through the yoke and having upwardly recessed pin point sockets which contact the pivot pins at the outer ends of the balance lever and retaining clips on the rods below the balance lever and adapted to limit the upward motion of the rods.

7. In a liquid level alarm, a hollow casing, an interiorly hollow valve support in the casing having a horizontal portion and communicating through the hollow with the outside of the casing, upwardly directed pin point pivot pins on the horizontal portion, a yoke-like balance lever extending across pivot pins and having upwardly recessed pin point sockets on the two sides of the yoke at the middle which engage the respective pivot pins, a downwardly directed valve seat connecting with the interior hollow of the support positioned equidistant between the pivot pins on the support, an upwardly directed valve cooperating with the seat, a valve ring surrounding the support and at the bottom mounting the valve, the valve ring extending up between the two sides of the yoke of the balance lever, a pivot pin extending across the yoke of the balance lever and through the valve ring at a position removed from the center, a stop pin across the yoke of the balance lever at a position further removed from the center at the same side as the pivot pin extending above and in position to engage the valve ring in stop position, upper and lower floats in the casing, and float rods connecting pivotally the respective floats to the respective ends of the balance lever.

8. In a liquid level alarm, a hollow casing, a pivot support in the casing having a generally horizontal portion, pin point pivot pins upwardly directed from the pivot support, a balance lever extending above the pivot pins and having upwardly recessed pin point sockets which engage the pivot pins at the middle of the balance lever, a downwardly directed valve seat on the pivot support communicating with the outside of the casing, an upwardly directed valve cooperating with the valve seat, a valve ring supporting the valve at its bottom, surrounding the pivot support, a pivot pin pivotally connecting the balance lever with the ring at a position removed from the center, upper and lower floats in the casing, upwardly directed pin point pivot pins at the opposite ends of the balance lever, an upper float rod secured to the upper float, extending over the balance lever and having an upwardly recessed pin point socket contacting one of the pivot pins at the end of the balance lever and extending downwardly below the upper float, a lower float rod secured to the lower float and extending upwardly and over the balance lever at the opposite end and having an upwardly recessed pin point socket which contacts the pivot pin at the opposite end of the balance lever and tie links extending between the upper float rod at a position below the upper float and the lower float rod and having sufficient freedom to cover the range of motion of the respective float rods.

9. In a liquid level alarm, a hollow casing, a generally horizontal pivot support in the casing, pin point pivot pins upwardly directed on the pivot support, a balance lever extending over the pivot pins and having downwardly recessed pin point sockets at the center which receive the pivot pins, a downwardly directed valve seat on the support communicating with the outside of the casing, a valve in one position engaging the valve seat and upwardly directed toward the valve seat, a valve ring mounting the valve at its bottom, and surrounding the pivot support, a pivot pin interconnecting the balance lever laterally with the valve ring at a distance from the center of the balance lever, the pivot pin and valve ring holding together the support, balance lever and valve as a unit, floats in the casing and float rods connected pivotally from the floats to the respective ends of the balance lever.

10. In a liquid level alarm, a hollow casing, a generally horizontally extending pivot support in the casing having spaced downwardly extending recesses, a pair of spaced upwardly directed conical pin point pivot pins in the recesses of the pivot support, one of the pins having lateral freedom in its recess, a lever having upwardly recessed pin point sockets which engage the pins, a steam valve having a valve element operatively connected to the lever and a seat communicating with the outside of the casing and floats in the casing respectively connected pivotally to the opposite ends of the lever.

WALTER J. KINDERMAN.
JAMES W. WILLIAMS, 3RD.

REFERENCES CITED

The following references are of record in the file of this patent:

UNITED STATES PATENTS

| Number | Name | Date |
|---|---|---|
| 924,962 | Boling | June 15, 1907 |
| 1,267,344 | Zimmerman | May 21, 1918 |
| 1,489,115 | Chenenaad | Apr. 1, 1924 |
| 1,558,147 | Davidson | Oct. 20, 1925 |
| 1,949,844 | Seederer | Mar. 6, 1934 |
| 2,002,327 | Miller | May 21, 1935 |
| 2,118,311 | Kinderman | May 24, 1938 |

FOREIGN PATENTS

| Number | Country | Date |
|---|---|---|
| 28,423 | Great Britain | of 1911 |